Figure 1:
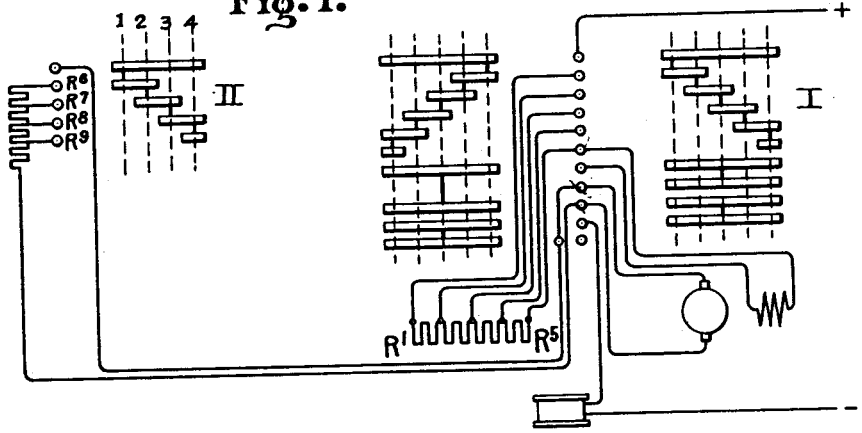

Inventors:
Hammond C. Hastings,
Charles T. Hanna,
by Alexander D. Lunt
Their Attorney.

Nov. 25, 1924.
H. C. HASTINGS ET AL
ELECTRIC MOTOR CONTROL
Filed March 10, 1923    2 Sheets-Sheet 2
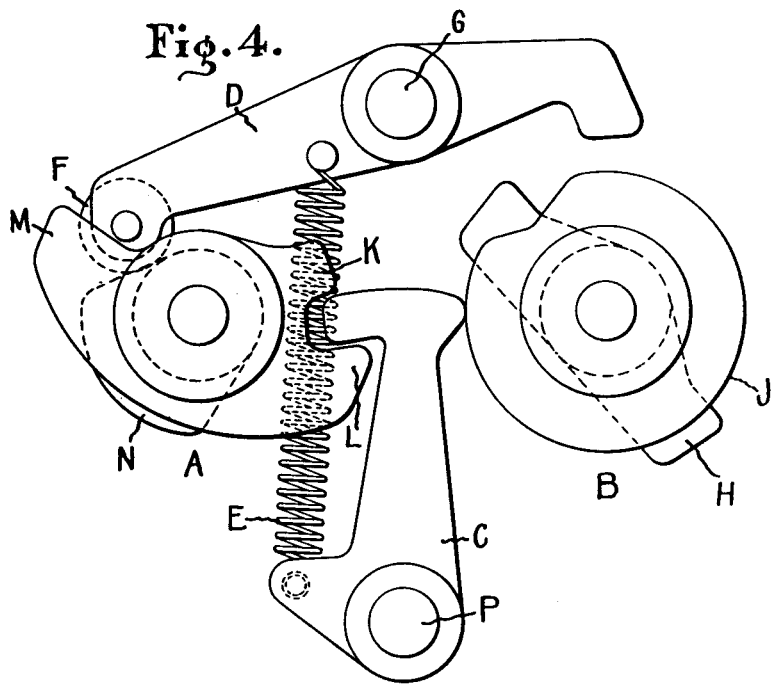
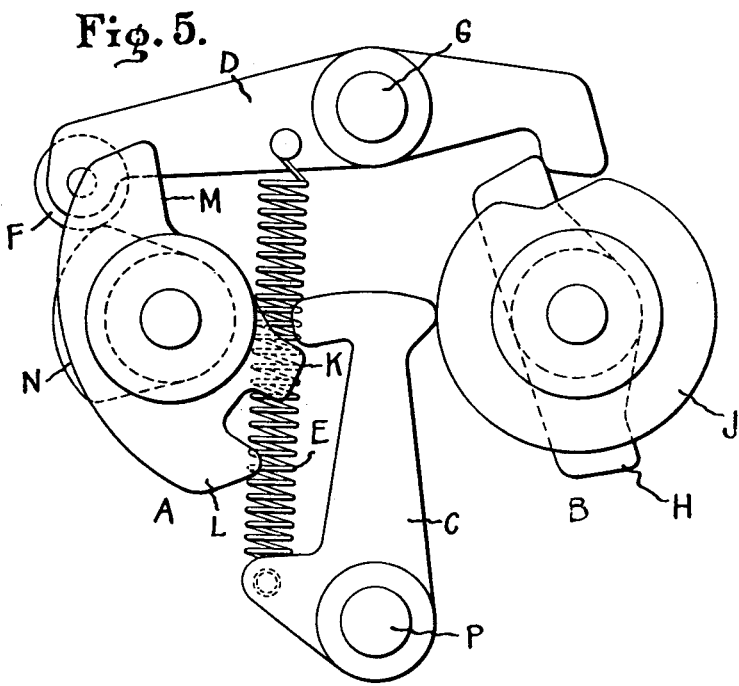
Inventors:
Hammond C. Hastings,
Charles T. Hanna,
Their Attorney.

Patented Nov. 25, 1924.

1,517,233

UNITED STATES PATENT OFFICE.

HAMMOND CHARLES HASTINGS AND CHARLES THOMAS HANNA, OF RUGBY, ENGLAND, ASSIGNORS TO GENERAL ELECTRIC COMPANY, A CORPORATION OF NEW YORK.

ELECTRIC-MOTOR CONTROL.

Application filed March 10, 1923. Serial No. 624,226.

*To all whom it may concern:*

Be it known that we, HAMMOND CHARLES HASTINGS and CHARLES THOMAS HANNA, subjects of the King of Great Britain, residing at Rugby, England, have invented certain new and useful Improvements in Electric-Motor Controls, of which the following is a specification.

The invention relates to the control of electric motors and has for its object to provide an improved method of and apparatus for their control so as to obtain very slow speeds at all loads. The invention is particularly applicable for controlling series motors used for operating foundry cranes, for example, where very slow speeds are desirable for lifting patterns from the moulds, but it is also applicable to shunt and compound wound motors, and may be used for any other purpose where slow speeds are desired.

The method generally adopted for obtaining slow speeds at all loads with a series motor consists in diverting or shunting from the armature of the motor a part of the current flowing through the series field winding and for this purpose the controller is provided with a few control points next to the "off" position arranged to shunt from the armature through a resistance a portion of the series field current. For higher speeds the shunt circuit round the armature is opened and control is effected by varying the series resistance only.

This combination gives satisfactory control of speed, but if, when the motor is running at a high speed, the controller handle is moved back from the series control notches through the slow motion points to the "off" position, excessive currents may be generated on the slow motion points, causing bad arcing at the commutator of the motor and also destructive arcing in the control device. The braking currents generated in this system of control may also subject the motor and gears to severe mechanical stresses.

The object of this invention is to overcome this trouble, and to that end it consists in providing means for insuring that the shunt circuit round the armature cannot be closed when the controller is being returned from the high speed running points to the off position.

In carrying the invention into effect in one form, we provide a controller having two cylinders operated by separate handles, one cylinder being used for regulating the resistance in the shunt circuit and the other being used in conjunction with the first for slow speed control, but adapted to be used separately for controlling the higher speeds.

Figure 2:
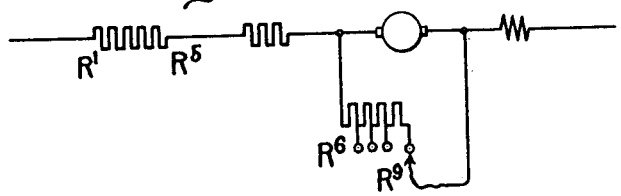
Figure 3:
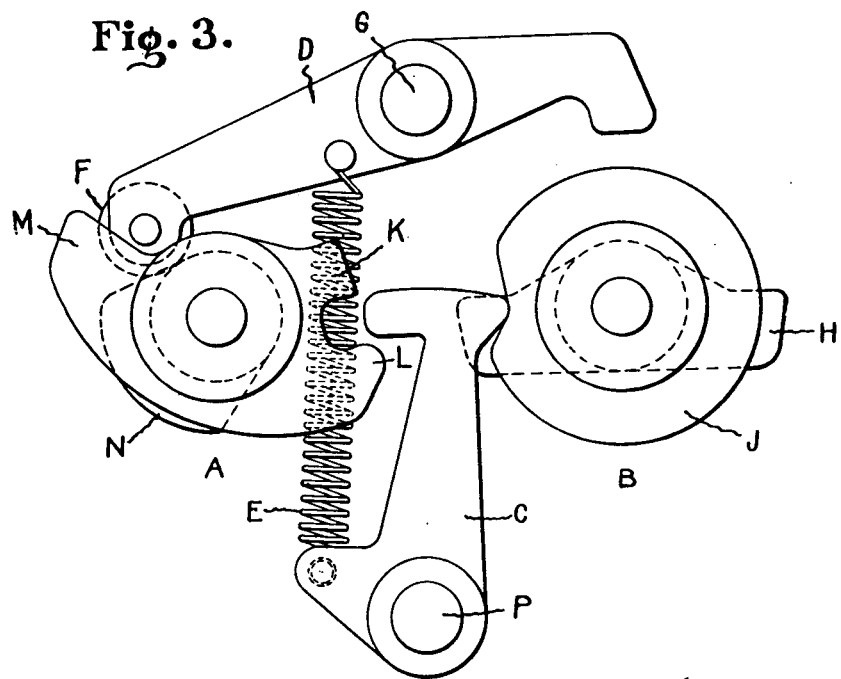

The accompanying drawings illustrate one method of carrying this invention into effect, Figs. 1 and 2 being diagrammatic views showing the controllers and connections and Figs. 3, 4 and 5 showing one method of interlocking the two controllers.

In Fig. 1 the cylinders I and II are shown in the off position, II being the separately operable cylinder controlling the resistances $R^6$ to $R^9$, which for slow speeds are connected as a shunt to the armature, as shown in Fig. 2. This cylinder is referred to hereinafter as the armature shunt cylinder.

The controller illustrated is suitable for reversing and for controlling the motor at slow and high speeds, both forward and reverse.

The two cylinders I and II are mechanically interlocked, so that the armature shunt cylinder II can be moved from the off position only when the main cylinder I is in the off position; also when the armature shunt cylinder is in any position other than the off position the main cylinder can be moved only to the first few resistance notches. Generally two points are sufficient for giving all the control that is necessary, thus, whenever the shunt circuit round the armature is completed by the cylinder II the main cylinder I cannot be moved to cut out more than a limited amount of the resistance $R^1$ $R^5$. This insures that the motor will run at a slow speed, the connections being as shown in Fig. 2.

The interlock between the two cylinders is also arranged so that the armature shunt cylinder cannot be moved back to its off position unless the cylinder I has been previously returned to, and is in the off position. This insures that all arcing due to opening the main circuit occurs on the contacts of the main cylinder I. It also insures that excessive braking currents cannot be generated when returning the main cylinder handle quickly from the high speed point to the off position.

This will be clearly seen when it is observed that the high speed control points can be obtained only by moving the main cylinder I past the second notch, and this cannot be done unless the armature shunt circuit is opened. When the main cylinder is returned from the high speed points to the off position no armature shunt circuits are made which would cause the braking currents to be generated.

One method of interlocking the two cylinders in order to obtain the conditions described above can be carried out as shown in Figs. 3, 4 and 5.

Referring to Fig. 3, A is the armature shunt cylinder and B the series control cylinder. The figure shows both cylinders in the "off" position. Assuming ordinary series control is required, cylinder B can be moved in either direction, but before reaching the first point in either direction, the cam J moves the lever C pivoted at P over to the left (see Fig. 4), and locks cylinder A in the "off" position.

On returning cylinder B to the "off" position the spring E pulls lever C into the original position and releases cylinder A.

Assuming armature shunt, or slow motion control is required, cylinder A is first moved to position 1, 2, 3 or 4 (depending on the speed required). This is shown in Fig. 5 and represents cylinder A moved over to a position corresponding to the first notch. The movement of this cylinder engages cam N on roller F and operates lever D, pivoted on G, so that the front end of this lever is depressed in order to engage on projection H, corresponding to the second notch on cylinder B. Having set cylinder A to a predetermined notch, cylinder B can then be rotated in either direction to either notch 1 or notch 2. The movement of this cylinder moves lever C over to the left as before and locks cylinder A against return to the "off" position by means of projection K engaging against lever C. It is therefore impossible to open the armature shunt circuit except when cylinder B is in the "off" position.

On cylinder A a projection M acts as a stop when it engages lever C corresponding to the fourth notch, preventing further movement of cylinder A.

When cylinder A is returned to the "off" position, spring E pulls lever D down and disengages lever D from projection H.

It will be observed that while we have referred to the switch mechanism for establishing the shunt path about the motor armature as a cylinder, any other suitable switch or switch mechanism may be used to establish this shunt circuit.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is,—

1. Means for controlling a variable resistor in series with the armature of an electric motor and for controlling a shunt circuit to the motor armature comprising a cylinder having an off and a plurality of operative positions for controlling the said series resistor, separately operable switch mechanism for controlling the said shunt to the motor armature, and interlocking connections between the said cylinder and the said switch mechanism for preventing establishing the shunt about the motor armature unless the said cylinder is in the off position and for then preventing short circuiting the entire series resistor by the said cylinder with the armature shunt established by the said switch mechanism.

2. Means for controlling a variable resistor in series with the armature of an electric motor and for controlling a shunt circuit to the motor armature comprising a cylinder having an off and a plurality of operative positions for controlling the said series resistor, separately operable switch mechanism for controlling the said shunt to the motor armature, and interlocking connections between the said cylinder and the said switch mechanism for preventing establishing a shunt about the motor armature unless the said cylinder is in the off position, for preventing short circuiting the entire series resistor by the said cylinder with the armature shunt established by the said switch mechanism and for requiring that the armature shunt circuit cannot be opened by the said switch mechanism until after the said cylinder is returned to the off position.

3. The combination in a system of motor control, of a variable resistor in series with the armature of the motor, a cylinder having an off and a plurality of operative positions for connecting the motor to a source of supply and for varying the said resistor, a second variable resistor, a second separately operable cylinder having an off position and a plurality of operative positions for connecting the said second resistor in a shunt to the motor armature and for varying the said second resistor, and pivotally mounted locking members coöperating with the said cylinders for preventing the connection of the said second resistor in shunt to the motor armature unless the said first cylinder is in the off position, for preventing short circuiting entirely the said series resistor by the first cylinder with the armature shunt established by the second cylinder and for requiring that the armature shunt circuit cannot be opened by the second cylinder until after the first cylinder has been returned to the off position.

In witness whereof, we have hereunto set our hands this fourteenth day of February, 1923.

HAMMOND CHARLES HASTINGS.
CHARLES THOMAS HANNA.

Witnesses:
N. EDGERAN-WALTON,
J. A. FOSTER.